(12) United States Patent
Watanabe (10) Patent No.: US 10,489,437 B2
(45) Date of Patent: Nov. 26, 2019

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Masao Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 249 days.

(21) Appl. No.: 15/010,588

(22) Filed: Jan. 29, 2016

(65) Prior Publication Data

US 2017/0068729 A1    Mar. 9, 2017

(30) Foreign Application Priority Data

Sep. 8, 2015   (JP) .................................. 2015-176321

(51) Int. Cl.
*G06F 16/35* (2019.01)
*G06F 16/332* (2019.01)
*G06F 16/335* (2019.01)

(52) U.S. Cl.
CPC ............ *G06F 16/35* (2019.01); *G06F 16/335* (2019.01)

(58) Field of Classification Search
CPC ......... G06F 17/30864; G06F 17/30867; G06F 17/30011; G06F 16/35; G06F 16/3329; G06F 16/335
USPC ...................................................... 707/736
See application file for complete search history.

(56) References Cited

U.S. PATENT DOCUMENTS

| | | | |
|---|---|---|---|
| 8,666,983 B2 * | 3/2014 | Brill .................. | G06F 17/30654 707/736 |
| 2004/0199483 A1 | 10/2004 | Nishigaki et al. | |
| 2015/0293970 A1 * | 10/2015 | Li ..................... | G06F 16/24532 707/722 |
| 2015/0317383 A1 * | 11/2015 | Alkov ................. | G06N 99/005 707/738 |
| 2016/0048514 A1 * | 2/2016 | Allen .................. | G06F 17/3043 707/731 |
| 2017/0004204 A1 * | 1/2017 | Bastide .............. | G06F 16/3329 |

FOREIGN PATENT DOCUMENTS

| | | |
|---|---|---|
| JP | 2004-303181 A | 10/2004 |
| JP | 2005-293412 A | 10/2005 |
| JP | 2013-54417 A  | 3/2013 |

OTHER PUBLICATIONS

Jul. 16, 2019 Notice of Reasons for Refusal issued in Japanese Patent Application No. 2015-176321.

* cited by examiner

*Primary Examiner* — Michael Pham
(74) *Attorney, Agent, or Firm* — Oliff PLC (57) ABSTRACT

An information processing apparatus includes a generating unit, a transmitting unit, a receiving unit, and an assigning unit. The generating unit generates a question about information that does not exist in target content. The transmitting unit transmits the question to a user related to the content. The receiving unit receives an answer to the question. The assigning unit assigns a pair of the question and the answer to the content.

3 Claims, 8 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-176321 filed Sep. 8, 2015.

BACKGROUND

Technical Field

The present invention relates to an information processing apparatus, an information processing method, and a non-transitory computer readable medium.

SUMMARY

According to an aspect of the invention, there is provided an information processing apparatus including a generating unit, a transmitting unit, a receiving unit, and an assigning unit. The generating unit generates a question about information that does not exist in target content. The transmitting unit transmits the question to a user related to the content. The receiving unit receives an answer to the question. The assigning unit assigns a pair of the question and the answer to the content.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described with reference to the attached drawings.

Figure 1:
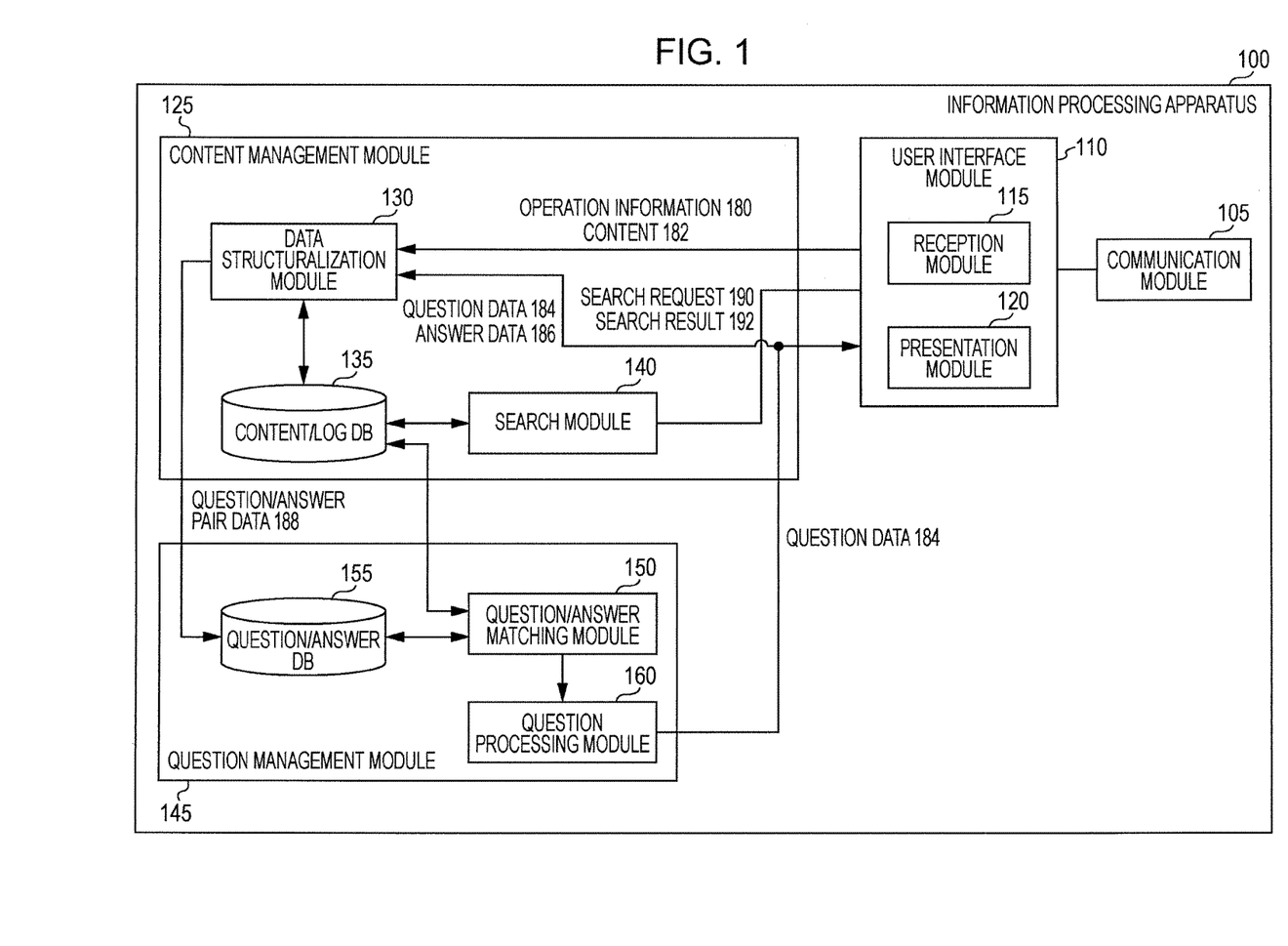
FIG. 1 is a conceptual module configuration diagram illustrating an example configuration according to the exemplary embodiment.

FIG. 1 is a conceptual module configuration diagram illustrating an example configuration according to the exemplary embodiment.

Modules are components of software (computer programs) or hardware that may be logically separated from one another in general. Thus, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to implement individual functions), a system, and a method. For the convenience of description, expressions "store" and "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, an instruction, a reference relationship between pieces of data, etc.) as well as a physical connection. "Predetermined" means being determined before target processing, and includes the meaning of being determined in accordance with a present situation/state or in accordance with a previous situation/state before target processing after processing according to the exemplary embodiment starts, as well as before processing according to the exemplary embodiment starts. In a case where there are plural predetermined values, the plural predetermined values may be different from one another, or two or more of the values (of course including all the values) may be the same. A description having the meaning "in the case of A, B is performed" is used as the meaning "whether A or not is determined, and B is performed if it is determined A", except for a case where determination of whether A or not is unnecessary.

A system or apparatus may be constituted by plural computers, hardware units, devices, or the like connected to one another via a communication medium, such as a network (including communication connections having a one-to-one correspondence), or may be constituted by a single computer, hardware unit, device, or the like. "Apparatus" and "system" are used synonymously. Of course, "system" does not include a man-made social "organization" (social system).

Target information is read from a storage device in individual processing operations performed by respective modules or in individual processing operations performed by a single module. After each processing operation has been performed, a processing result is written into the storage device. Thus, a description of reading from the storage device before a processing operation and writing into the storage device after a processing operation may be omitted. Here, examples of the storage device include a hard disk, a random access memory (RAM), an external storage medium, a storage device connected through a communication network, a register in a central processing unit (CPU), and the like.

An information processing apparatus 100 according to the exemplary embodiment manages content, and includes, as illustrated in FIG. 1, a communication module 105, a user interface module 110, a content management module 125, and a question management module 145.

The information processing apparatus 100 may be used for design assistance, for example. In this case, target content may be a drawing, a design specification, a technical standard document, a report, or the like.

In a design task, for example, a developer who conducts the task accesses many tools and accesses various pieces of data.

To handle such tools and data requires a specialist knowledge or know-how, and the handling varies depending on the skill of the developer.

In a former practice, a design margin (a range of an acceptable design value) is larger and thus the variations are allowed in product development. However, recent trends toward higher development speed and lower cost have greatly decreased the design margin, and individual developers are required to have a broad design knowledge or know-how.

In a case where the information processing apparatus 100 according to the exemplary embodiment is used for a design task, the information processing apparatus 100 gives design knowledge or know-how to content, such as a drawing, which is a result of the design task. To derive design knowledge or know-how from a designer or the like, a question about information that does not exist in the content is asked and an answer is obtained.

The communication module 105 is connected to the user interface module 110. The communication module 105 communicates with a user terminal 210 that is used by a user such as a designer, a design assisting apparatus 250, and so forth.

The user interface module 110 includes a reception module 115 and a presentation module 120, and is connected to the communication module 105, a data structuralization module 130 and a search module 140 of the content management module 125, and a question processing module 160 of the question management module 145. The user interface module 110 performs data communication between the user terminal 210 or the design assisting apparatus 250 and the content management module 125 or the question management module 145 via the communication module 105.

The reception module 115 receives information transmitted from the user terminal 210, the design assisting apparatus 250, or the like, and transmits the information to the content management module 125. For example, the reception module 115 receives operation information 180, content 182, answer data 186, or a search request 190. The content 182 may be, for example, any one of a document, video, audio, moving image, and so forth, or any combination thereof.

The presentation module 120 transmits information received from the content management module 125 or the question management module 145 to the user terminal 210, the design assisting apparatus 250, or the like. For example, the presentation module 120 transmits question data 184 or a search result 192 as information to be presented. The question data 184 may be, for example, any one of text (sentences), audio, moving image, and so forth, or any combination thereof. Thus, presentation may be display on a display device such as a liquid crystal display of the user terminal 210, printing by a printing device such as a printer, or output or vibration of audio from an audio output device such as a speaker, or may be any combination thereof.

The content management module 125 includes the data structuralization module 130, a content/log database (DB) 135, and the search module 140. The content management module 125 manages the operation information 180 and the content 182 and performs search thereon.

The data structuralization module 130 is connected to the content/log DB 135, the user interface module 110, and a question/answer DB 155 and the question processing module 160 of the question management module 145. The data structuralization module 130 performs control to divide the question data 184 received from the question processing module 160 and the answer data 186 to the question data 184 obtained from a user into words and to store a group of the words and target content in the content/log DB 135. Further, the data structuralization module 130 may assign, as attributes of the content, information representing the user who has created or registered the content, information representing the user who has transmitted the response data 186, information representing the date and time when the question data 184 or the answer data 186 was created or registered (year, month, date, hour, minute, second, millisecond or smaller unit, or any combination thereof), and so forth.

Further, the data structuralization module 130 may link a first pair of the question data 184 and answer data to the question data 184, to a second pair of past question data and past answer data, the second pair being similar to the first pair and stored in the question/answer DB 155.

Further, the data structuralization module 130 may determine a degree of similarity between the first pair and the second pair in accordance with a ratio of characters identical between the words contained in the question data 184 and the answer data 186 in the first pair and the words contained in the question data and the answer data in the second pair.

For example, a pair of the question data 184 and the answer data 186 may be linked to a pair of the most similar question data and answer data by performing similarity evaluation on pairs of past question data and answer data, or may be linked by applying a weight in accordance with a degree of similarity obtained as a result of the similarity evaluation. Here, the similarity evaluation may be performed on words constituting a pair of question data and answer data. If the ratio of characters identical between two sets is larger than/equal to or larger than a predetermined ratio, the two sets may be determined to be similar to each other. Here, the ratio of identical characters is used for the following reason. Since abbreviations or the like are often used in designing, similarity evaluation may be performed in units of characters, the number of identical characters may be counted, and the ratio thereof (the ratio of the identical characters to all the characters in the pair) may be calculated. That is, a group of pairs, each including past question data and past answer data, may be prepared in the question/answer DB 155, and a pair that is the most similar to the content of the question data 184 and the answer data 186 may be selected to be linked.

Another method for similarity evaluation is calculating a distance between a pair of question data and answer data and another pair in a feature space and regarding the reciprocal of the distance as a degree of similarity. Alternatively, classification may be performed and items in the same loop may be determined to be similar to one another. Examples of a classification method include a nearest neighbor method, naive Bayes method, decision tree, support vector machine, and neural network.

The content/log DB 135 is connected to the data structuralization module 130, the search module 140, and a question/answer matching module 150 of the question management module 145. The content/log DB 135 stores the content 182, the operation information 180, question/answer pair data 188, and ontology that is necessary for designing. Here, ontology is a system (data group) describing knowledge and is, for example, like the data structure illustrated in FIG. 7 (described below), a relationship among data pieces representing concepts which is expressed by links. The content 182 is assigned with data of conversations performed between the information processing apparatus 100 and the user when the content 182 is stored (a pair of the question data 184 and the answer data 186).

The search module 140 is connected to the content/log DB 135 and the user interface module 110. The search module 140 receives the search request 190 from the user terminal 210, searches the content/log DB 135 in accordance with the search request 190, and transmits the search result 192 to the user terminal 210. If the search result 192 includes content, the user is able to obtain design knowledge or know-how about the content.

The question management module 145 includes the question/answer matching module 150, the question/answer DB 155, and the question processing module 160.

The question/answer matching module 150 is connected to the question/answer DB 155, the question processing module 160, and the content/log DB 135 of the content management module 125. The question/answer matching module 150 generates a question about information that does not exist in target content. As the question, information lacking in the content may be extracted by referring to pairs of past question data and past answer data in the question/answer DB 155 or various ontologies in the content/log DB 135. Of course, the source of extraction is various ontologies. Specifically, past question data containing a group of words similar to a group of words in the content is extracted from the question/answer DB 155, and the words (question data) that are contained in the answer data to the past question data and that are not contained in the content are extracted. Also, as "the information that does not exist in the target content", words or the like used in an unexecuted process in a workflow (a kind of ontology) using the content may be used.

The question/answer DB 155 is connected to the question/answer matching module 150 and the data structuralization module 130 of the content management module 125. The question/answer DB 155 stores pairs of question data and answer data. As described above, the pairs are linked to one another to form a kind of ontology.

The question processing module 160 is connected to the question/answer matching module 150, the user interface module 110, and the data structuralization module 130 of the content management module 125. The question processing module 160 transmits, to a user related to content via the presentation module 120 and the communication module 105, the question generated by the question/answer matching module 150. The "user related to content" may be, for example, the user who has transmitted the content or the user who has created or edited the content. As information about the user (for example, a user ID, a user address, and so forth), information that is used when the user logs in to use the information processing apparatus 100 may be used, or information given as an attribute of the content may be extracted.

The data structuralization module 130 receives, via the communication module 105 and the reception module 115, an answer to the question transmitted by the question processing module 160, and assigns the pair of the question and answer to the target content.

Figure 2:
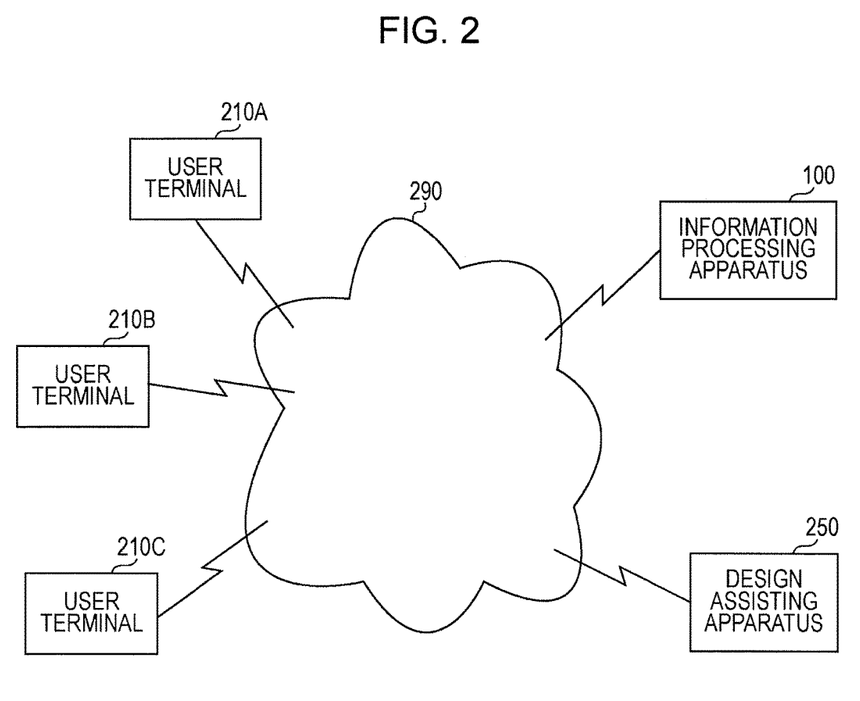
FIG. 2 is an explanatory diagram illustrating an example system configuration according to the exemplary embodiment.

FIG. 2 is an explanatory diagram illustrating an example system configuration according to the exemplary embodiment.

The information processing apparatus 100, a user terminal 210A, a user terminal 210B, a user terminal 210C, and the design assisting apparatus 250 are connected to one another via a communication network 290. The communication network 290 may be wireless, wired, or a combination thereof, and may be, for example, the Internet or an intranet serving as a communication infrastructure. The functions of the information processing apparatus 100 and the design assisting apparatus 250 may be implemented as a cloud service. Examples of the design assisting apparatus 250 include a computer aided design (CAD) apparatus, a circuit designing apparatus, a pattern designing apparatus, and a document management apparatus. The information processing apparatus 100 may be incorporated into the design assisting apparatus 250. The user terminal 210 includes a browser or the like and communicates with the information processing apparatus 100, the design assisting apparatus 250, and so forth. The user terminal 210 may be, for example, a personal computer, a mobile apparatus including a mobile phone such as a smartphone, or the like.

A user such as a designer performs designing by using the user terminal 210 alone or by using the design assisting apparatus 250 via the user terminal 210, and stores content, which is a result of the designing, in the information processing apparatus 100. At the time of storing the content, the information processing apparatus 100 asks a question about information that does not exist in the content, and obtains an answer from the user. Also, the information processing apparatus 100 associates the pair of the question and answer with the content. When receiving a search request, the information processing apparatus 100 searches for the content and an attribute of the content including the pair of the question and answer.

Figure 3:
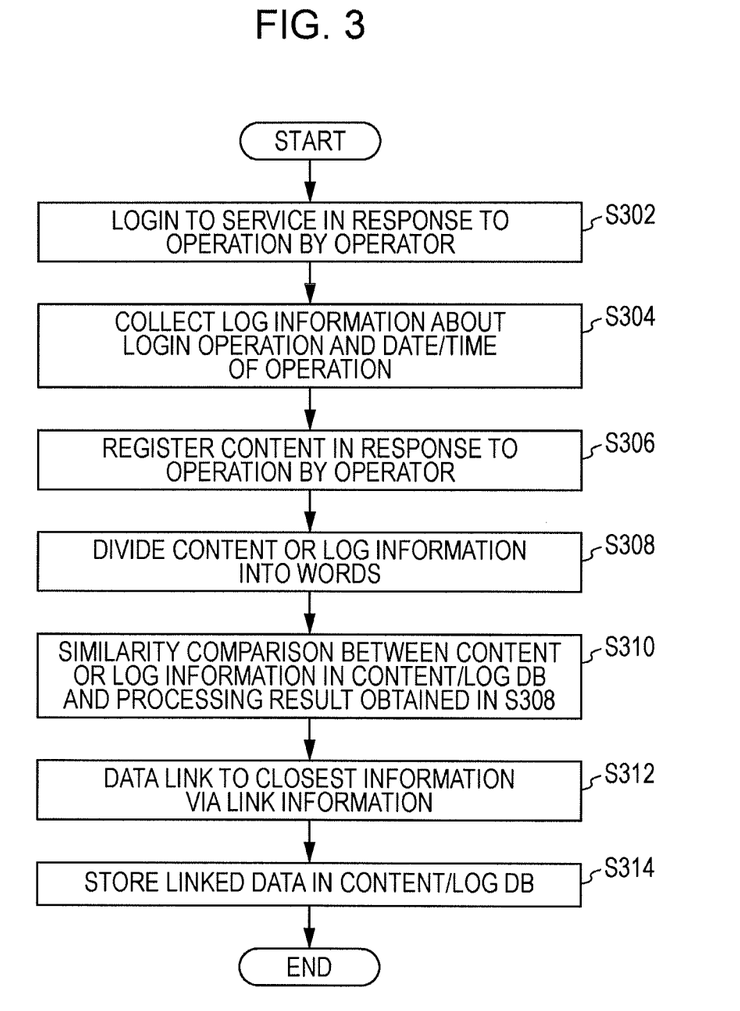
FIG. 3 is a flowchart illustrating an example of processing according to the exemplary embodiment.

FIG. 3 is a flowchart illustrating an example of processing according to the exemplary embodiment. This is an example of processing for registering the content 182.

In step S302, login to a service is performed in response to an operation performed by an operator (for example, a designer).

In step S304, log information (operation information 180) about the login operation performed by the operator and the date and time of the operation is collected.

In step S306, the content 182 is registered in response to an operation performed by the operator.

In step S308, the content 182 or the log information (operation information 180) is divided into words.

In step S310, similarity comparison between content or log information in the content/log DB 135 and the processing result obtained in step S308 is performed.

In step S312, data link to the closest information is established via link information. As described above, the data link may be established via weighted link information corresponding to a degree of similarity.

In step S314, the linked data is stored in the content/log DB 135.

Figure 4:
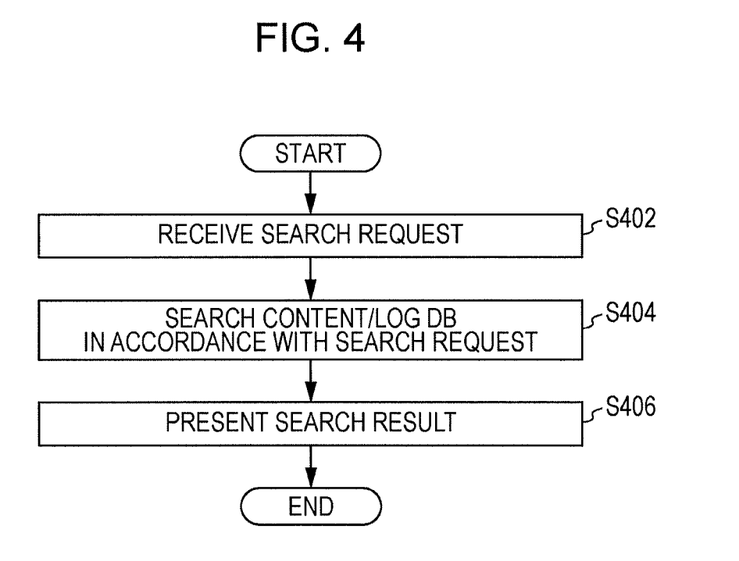
FIG. 4 is a flowchart illustrating an example of processing according to the exemplary embodiment.

FIG. 4 is a flowchart illustrating an example of processing according to the exemplary embodiment. This is search processing performed by the search module 140, in which a user who has made the search request 190 is able to obtain question data and answer data assigned to content.

In step S402, the search request 190 is received in accordance with an operation performed by an operator.

In step S404, the content/log DB 135 is searched in accordance with the search request 190.

In step S406, the search result 192 is presented to the operator.

Figure 5:
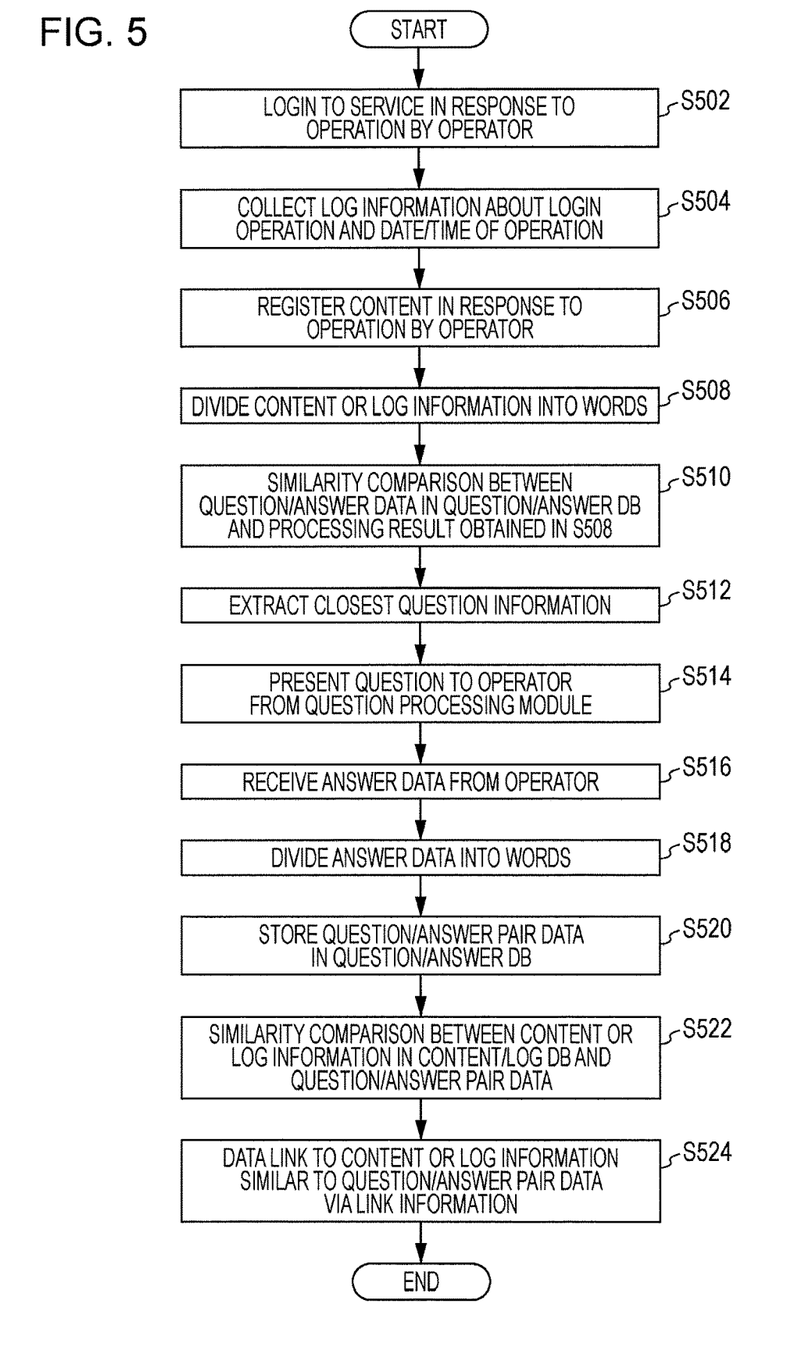
FIG. 5 is a flowchart illustrating an example of processing according to the exemplary embodiment.

FIG. 5 is a flowchart illustrating an example of processing according to the exemplary embodiment. This is an example of question processing that is performed when the content 182 is registered.

In step S502, login to a service is performed in response to an operation performed by an operator.

In step S504, log information about the login operation performed by the operator and the date and time of the operation is collected.

In step S506, the content is registered in response to an operation performed by the operator.

In step S508, the content or the log information is divided into words.

In step S510, similarity comparison between question/answer data in the question/answer DB 155 and the processing result obtained in step S508 is performed.

In step S512, the closest question information is extracted. It is determined whether answer information for the question information does not exist in the content. If there is not the answer information, the processing proceeds to step S514. If there is the answer information, the second closest information is extracted, and it is determined whether answer information for the question information does not exist in the content. This processing is repeated.

In step S514, a question is presented to the operator from the question processing module 160.

In step S516, the answer data 186 is received from the operator.

In step S518, the answer data 186 is divided into words.

In step S520, the question/answer pair data 188 is stored in the question/answer DB 155.

In step S522, similarity comparison between the content or log information in the content/log DB 135 and the question/answer pair data 188 is performed.

In step S524, data link to content or log information similar to the question/answer pair data 188 is established via link information. Alternatively, data link to the question/answer pair data 188 similar to the content or log information may be established via link information.

Steps S502 to S508 are the same as steps S302 to S308 in the flowchart illustrated in FIG. 3. That is, the processing from step S510 and the processing from step S310 may be performed in parallel, or one of them may be performed first.

In a case where the content 182 has been registered, the processing from step S510 and the processing from step S310 may be performed. In a case where the processing illustrated in FIG. 3 and the processing illustrated in FIG. 5 are performed and in a case where information other than content (operation information 180) has been registered, the processing from step S310 may be performed, with the processing from step S510 not being performed.

Figure 6:
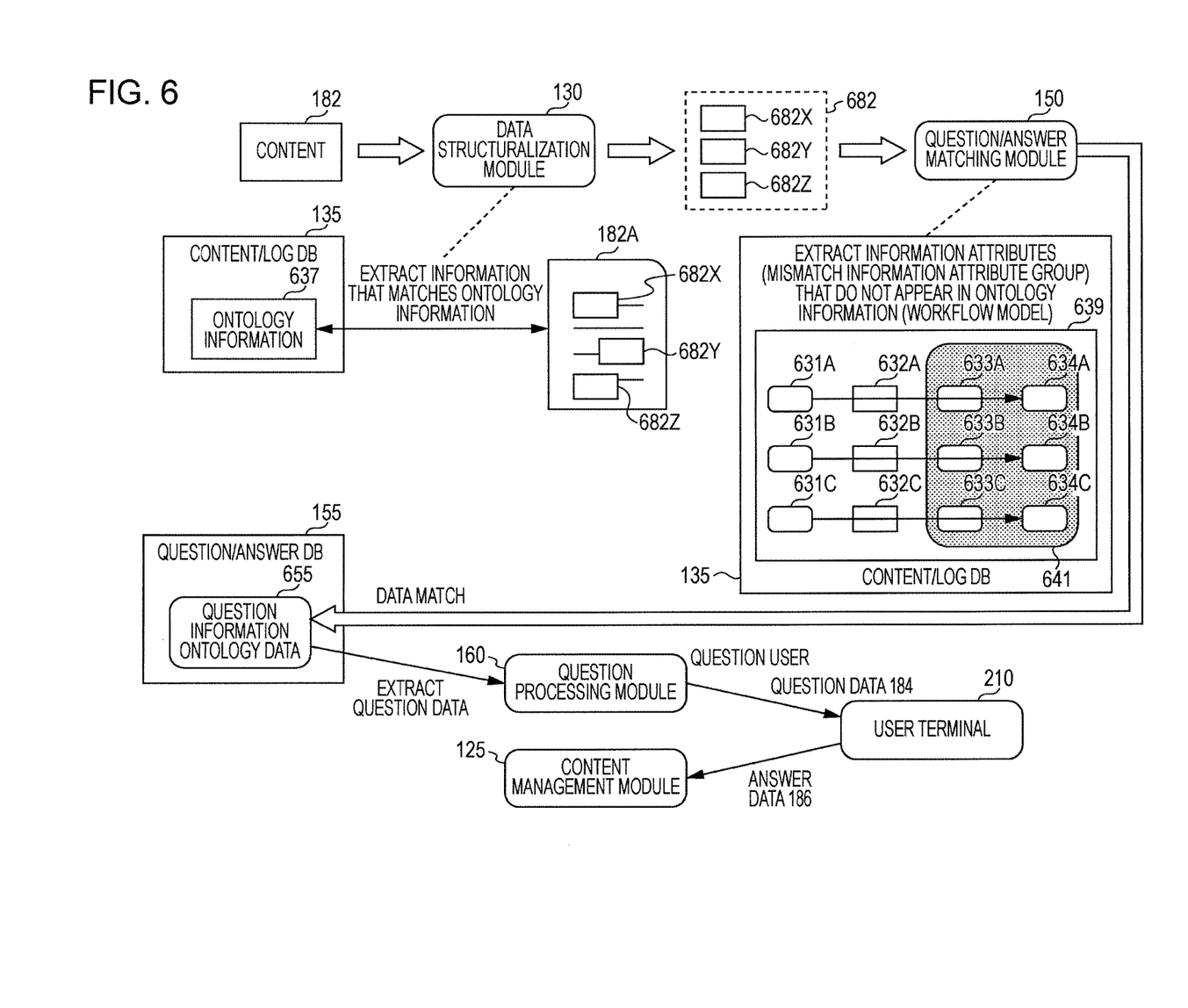
FIG. 6 is an explanatory diagram illustrating an example of processing according to the exemplary embodiment.

FIG. 6 is an explanatory diagram illustrating an example of processing according to the exemplary embodiment.

First, the content 182, such as a drawing, a technical standard document, or a report, is received.

The data structuralization module 130 extracts words (a content key term 682X, a content key term 682Y, and a content key term 682Z) from the content 182. The data structuralization module 130 may extract attribute information in addition to the words described in the content 182. Subsequently, the data structuralization module 130 extracts information that matches the words in content 182A and ontology information 637 in the content/log DB 135. For example, the content that has previously been registered as the ontology information 637 may be regarded as a target. Here, it is assumed that a content key term group 682 including the content key term 682X, the content key term 682Y, and the content key term 682Z is extracted as matching words from the content 182A.

The question/answer matching module 150 performs matching between the extracted content key term group 682 and ontology information (a workflow model expressed by ontology) 639 stored in the content/log DB 135. Examples of the workflow of the ontology information 639 includes (1) a workflow A constituted by a workflow element 631A, a workflow element 632A, a workflow element 633A, and a workflow element 634A in this order, (2) a workflow B constituted by a workflow element 631B, a workflow element 632B, a workflow element 633B, and a workflow element 634B in this order, and (3) a workflow C constituted by a workflow element 631C, a workflow element 632C, a workflow element 633C, and a workflow element 634C in this order. Among them, it is assumed that the content key term 682X corresponds to the workflow element 632A, the content key term 682Y corresponds to the workflow element 632B, and the content key term 682Z corresponds to the workflow element 632C. A workflow element that has not been executed is extracted from these workflows. Specifically, a mismatch information attribute group 641 including the workflow elements 633A, 634A, 633B, 634B, 633C, and 634C is extracted.

Data matching processing between the mismatch information attribute group 641 and question information ontology data 655 in the question/answer DB 155 is performed. That is, data matching processing with respect to past question data or past answer data is performed. Specifically, question data or answer data containing words that match the words contained in the mismatch information attribute group 641 is extracted. If the answer data is extracted, the question data corresponding to the answer data is extracted. The question processing module 160 asks a question to the user who has registered the content 182 by using the extracted question data (transmits the question data 184 to the user terminal 210 of the user).

The user answers the question (the answer data 186 is transmitted from the user terminal 210 of the user). The content management module 125 structuralizes the answer data 186, assigns the structuralized answer data 186 to the content 182, and stores the content 182 in the content/log DB 135.

Figure 7:
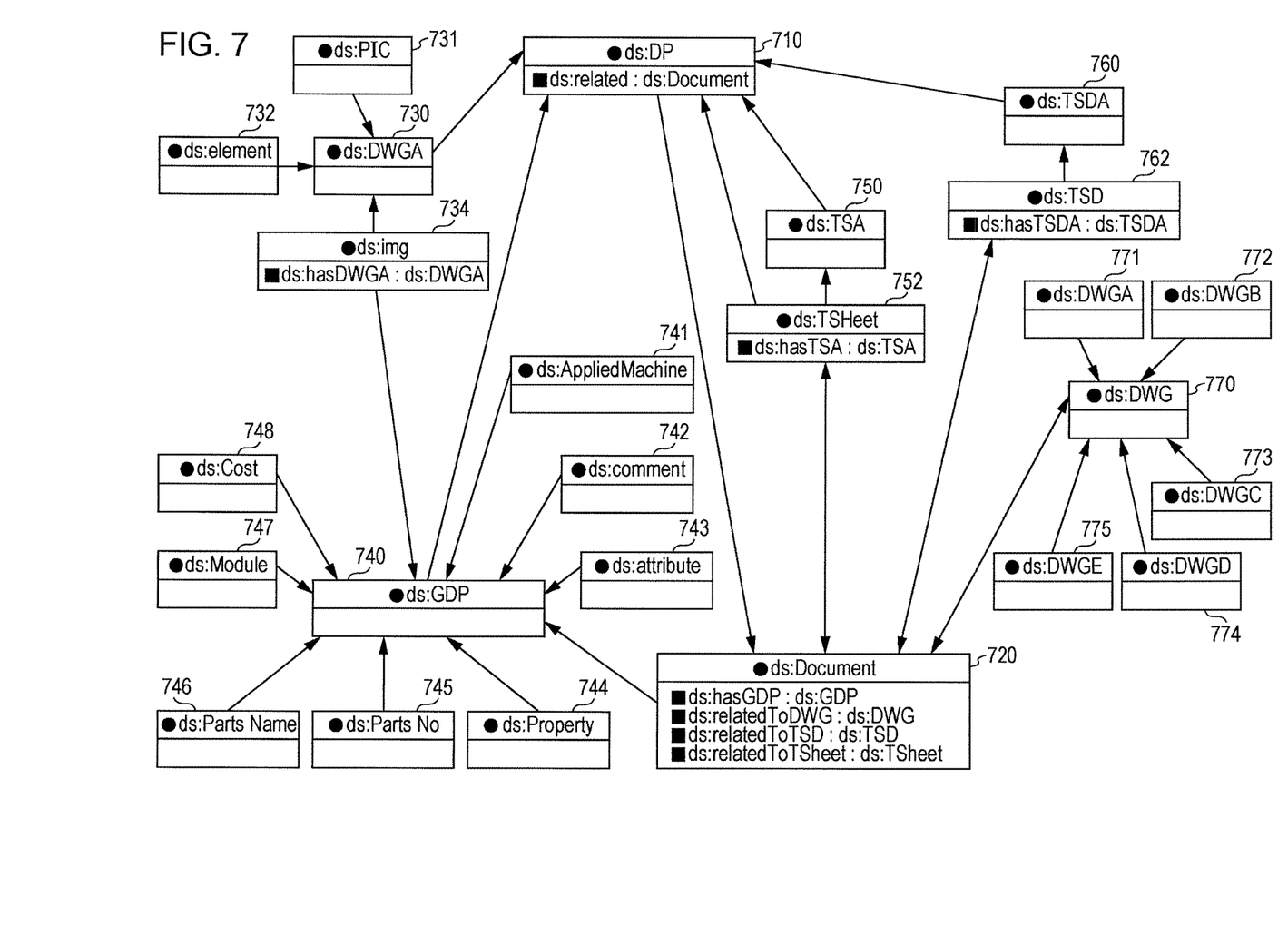
FIG. 7 is an explanatory diagram illustrating an example of link structure data.

FIG. 7 is an explanatory diagram illustrating an example of link structure data expressing ontology. Pieces of data are connected to one another by links having directions. Each link may be weighted in accordance with a degree of similarity between the two pieces of data, as described above.

dsDP 710 is linked to dsDocument 720, and is linked from dsDWGA 730, dsGDP 740, dsTSA 750, dsTSheet 752, and dsTSDA 760. dsDocument 720 is linked to dsGDP 740, and is linked from dsDP 710, dsTSheet 752, dsTSD 762, and dsDWG 770. dsDWGA 730 is linked to dsDP 710, and is linked from dsPIC 731, dselement 732, and dsimg 734. dsPIC 731 is linked to dsDWGA 730. dselement 732 is linked to dsDWGA 730. dsimg 734 is linked to dsDWGA 730 and dsGDP 740. dsGDP 740 is linked to dsDP 710, and is linked from dsDocument 720, dsimg 734, dsAppliedMachine 741, dscomment 742, dsattribute 743, dsProperty 744, dsParts No 745, dsParts Name 746, dsModule 747, and dsCost 748. dsAppliedMachine 741 is lined to dsGDP 740. dscomment 742 is linked to dsGDP 740. dsattribute 743 is linked to dsGDP 740. dsProperty 744 is linked to dsGDP 740. dsParts No 745 is linked to dsGDP 740. dsParts Name 746 is linked to dsGDP 740. dsModule 747 is linked to dsGDP 740. dsCost 748 is linked to dsGDP 740. dsTSA 750 is linked to dsDP 710, and is linked from dsTSheet 752. dsTSheet 752 is linked to dsDP 710 and dsTSA 750, and is linked from dsDocument 720. dsTSDA 760 is linked to dsDP 710 and is linked from dsTSD 762. dsTSD 762 is linked to dsTSDA 760, and is linked from dsDocument 720. dsDWG 770 is linked from dsDocument 720, dsDWGA 771, dsDWGB 772, dsDWGC 773, dsDWGD 774, and dsDWGE 775. dsDWGA 771 is linked to dsDWG 770. dsDWGB 772 is linked to dsDWG 770. dsDWGC 773 is linked to dsDWG 770. dsDWGD 774 is linked to dsDWG 770. dsDWGE 775 is linked to dsDWG 770.

Figure 8:
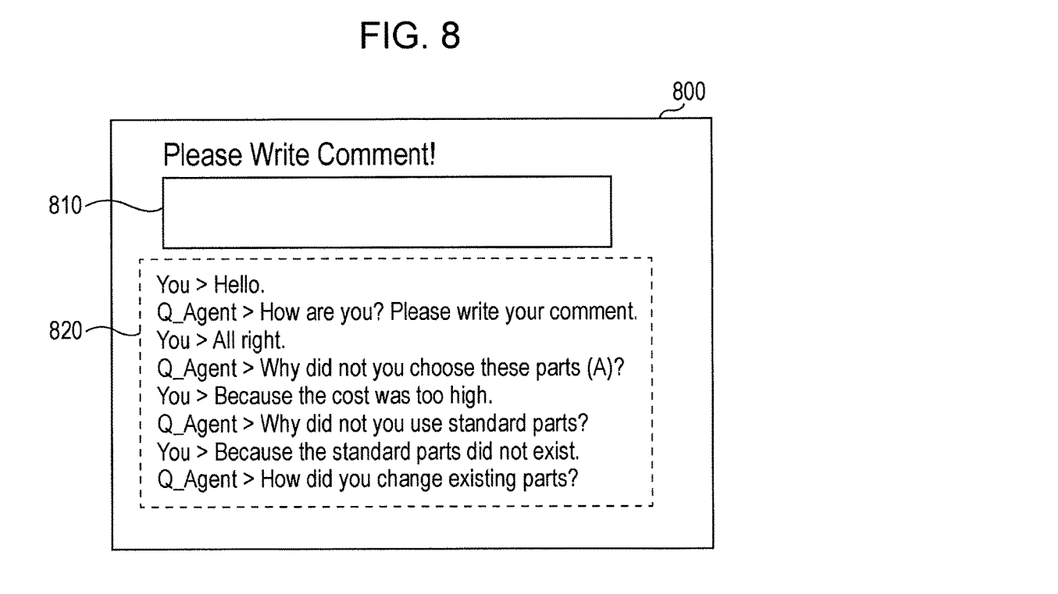
FIG. 8 is an explanatory diagram illustrating an example of processing (example of presentation of questions) according to the exemplary embodiment.

FIG. 8 is an explanatory diagram illustrating an example of processing (example of presentation of questions) according to the exemplary embodiment.

An answer area 810 and a question/answer history area 820 are displayed on a question/answer screen 800 of the user terminal 210. The question/answer screen 800 is displayed after content has been stored in accordance with an operation performed by the user.

An answer to a question is written in the answer area 810 in accordance with an operation performed by the user.

In the example illustrated in FIG. 8, past questions and answers are displayed in the question/answer history area 820 as given below. In this example, the stored content does not include "parts (A)" and "standard parts".
You>Hello.
Q_Agent>How are you? Please write your comment.
You>All right.
Q_Agent>Why did not you choose these parts (A)?
You>Because the cost was too high.
Q_Agent>Why did not you use standard parts?
You>Because the standard parts did not exist.
Q_Agent>How did you change existing parts?

Figure 9:
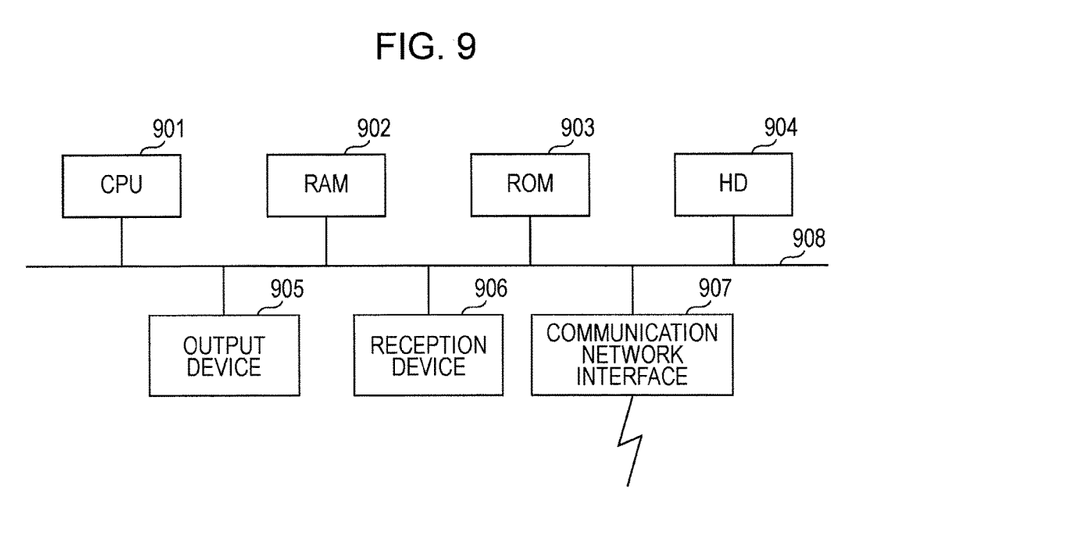
FIG. 9 is a block diagram illustrating an example hardware configuration of a computer that implements the exemplary embodiment.

A computer that executes a program according to the exemplary embodiment has a hardware configuration equivalent to that of a typical computer, specifically, a personal computer or a computer that may serve as a server, as illustrated in FIG. 9. That is, as a specific example, a central processing unit (CPU) 901 is used as a processing unit (arithmetic unit), and a random access memory (RAM) 902, a read only memory (ROM) 903, and a hard disk (HD) 904 are used as storage devices. A hard disk or a solid state drive (SSD) may be used as the HD 904. The computer is constituted by the CPU 901 that executes a program implementing the communication module 105, the user interface module 110, the reception module 115, the presentation module 120, the content management module 125, the data structuralization module 130, the search module 140, the question management module 145, the question/answer matching module 150, the question processing module 160, and so forth; the RAM 902 storing the program and data; the ROM 903 storing a program for starting the computer; the HD 904 serving as an auxiliary storage device (or may be a flash memory or the like) having the functions of the content/log DB 135 and the question/answer DB 155; a reception device 906 that receives data in accordance with an operation performed on a keyboard, mouse, touch panel, microphone, or the like by a user; an output device 905 such as a cathode ray tube (CRT), liquid crystal display, or speaker; a communication network interface 907 for connecting to a communication network, such as a network interface card; and a bus 908 for connecting these devices so that data is transmitted and received among these devices. Plural computers, each having the above-described configuration, may be connected to one another via a network.

Among the elements of the above-described exemplary embodiment, an element based on a computer program is implemented by causing a system having the above-described hardware configuration to read the computer program as software, and causing software resources and hardware resources to cooperate with each other, so that the above-described exemplary embodiment is implemented.

The hardware configuration illustrated in FIG. 9 is one example configuration. The hardware configuration according to the exemplary embodiment is not limited to the configuration illustrated in FIG. 9, and any other configurations are applicable as long as the configuration is able to execute the modules described above in the exemplary embodiment. For example, some of the modules may be constituted by dedicated hardware (for example, an application specific integrated circuit (ASIC)). Some of the modules may be provided in an external system and may be connected via a communication network. Further, plural systems each having the configuration illustrated in FIG. 9 may be connected to one another via a communication network so that the systems operate in cooperation with one another. In particular, some of the modules may be incorporated into a mobile information communication apparatus (including a mobile phone, a smartphone, a mobile apparatus, a wearable computer, or the like), an information appliance, a robot, a copier, a facsimile, a scanner, a printer, or a multifunction peripheral (an image processing apparatus having two or more functions among a scan function, a print function, a copy function, a facsimile function, and so forth), other than a personal computer.

The above-described exemplary embodiment is applied to design assistance. The exemplary embodiment may be applied to any other tasks in which content is created. For example, the exemplary embodiment may be applied to creation of business documents or books.

The above-described program may be provided by storing it in a recording medium, or may be provided via a communication medium. In this case, for example, the above-described program may be regarded as "a computer readable recording medium storing a program".

"The computer readable recording medium storing a program" is a computer readable recording medium storing a program and used for installing, executing, or circulating the program.

Examples of the recording medium include a digital versatile disc (DVD), for example, the standards defined by the DVD forum: DVD-R, DVD-RW, DVD-RAM, and so forth, and the standards defined by DVD+RW: DVD+R, DVD+RW, and so forth; a compact disc (CD), for example, a read only memory (CD-ROM), a CD recordable (CD-R), a CD rewritable (CD-RW), and so forth; a Blu-ray (registered trademark) Disc; a magneto-optical (MO) disc; a flexible disk (FD); a magnetic tape; a hard disk; a read only memory (ROM); an electrically erasable and programmable ROM (EEPROM, registered trademark); a flash memory; a random access memory (RAM); and a secure digital (SD) memory card.

The above-described program or part of the program may be stored or circulated by recording it on the recording medium. Alternatively, the program or part of the program may be transmitted through communication, for example, using a wired network such as a local area network (LAN), a metropolitan area network (MAN), a wide area network (WAN), the Internet, an intranet, or an extranet, or a wireless communication network, or a transmission medium that is obtained by combining the wired and wireless networks. Alternatively, the program or part of the program may be carried using carrier waves.

Further, the above-described program may be part of another program, or may be recorded on a recording medium together with another program. Alternatively, the program may be recorded on plural recording media in a distributed manner. The manner in which the program is recorded is not specified as long as the program is able to be compressed, encrypted, and restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus for use in product design development, the information processing apparatus comprising a processor programmed to function as:
   a generating unit that generates a question about information that does not exist in target content in response to new content registered by a first user and a similarity comparison between the new content and existing question and answer data, wherein the target content and the new content each comprise at least one of a drawing, a design specification, a technical standard document, and a report;
   a transmitting unit that transmits the question to a second user related to the target content;
   a receiving unit that receives an answer to the question from the second user;
   an assigning unit that assigns to the target content the question and the answer to the question as a first pair; and
   a controller that performs control to:
      divide the question and the answer to the question into words and to store a group of the words and the target content in a memory, and
      link the first pair of the question and the answer to the question to a second pair of a past question and a past answer, the second pair being similar to the first pair and stored in the memory, wherein the controller determines a degree of similarity between the first pair and the second pair in accordance with a ratio of characters identical between words contained in the question and the answer in the first pair and words contained in the past question and the past answer in the second pair.

2. An information processing method for use in product design development, the method comprising:
   generating a question about information that does not exist in target content in response to new content registered by a first user and a similarity comparison between the new content and existing question and answer data, wherein the target content and the new content each comprise at least one of a drawing, a design specification, a technical standard document, and a report;
   transmitting the question to a second user related to the target content;
   receiving an answer to the question from the second user;
   assigning to the target content the question and the answer to the question as a first pair;
   dividing the question and the answer to the question into words and to store a group of the words and the target content in a memory; and
   linking the first pair of the question and the answer to the question to a second pair of a past question and a past answer, the second pair being similar to the first pair and stored in the memory, wherein linking the first pair and the second pair includes determining a degree of similarity between the first pair and the second pair in accordance with a ratio of characters identical between words contained in the question and the answer in the first pair and words contained in the past question and the past answer in the second pair.

3. A non-transitory computer readable medium storing a program causing a computer to execute a process for information processing for use in product design development, the process comprising:
   generating a question about information that does not exist in target content in response to new content registered by a first user and a similarity comparison between the new content and existing question and answer data, wherein the target content and the new content each comprise at least one of a drawing, a design specification, a technical standard document, and a report;
   transmitting the question to a second user related to the target content;
   receiving an answer to the question from the second user;
   assigning to the target content the question and the answer to the question as a first pair;
   dividing the question and the answer to the question into words and storing a group of the words and the target content in a memory; and
   linking the first pair of the question and the answer to the question to a second pair of a past question and a past answer, the second pair being similar to the first pair and stored in the memory, wherein linking the first pair and the second pair includes determining a degree of similarity between the first pair and the second pair in accordance with a ratio of characters identical between words contained in the question and the answer in the first pair and words contained in the past question and the past answer in the second pair.

* * * * *